United States Patent
Lee et al.

(10) Patent No.: US 11,393,112 B2
(45) Date of Patent: Jul. 19, 2022

(54) CAMERA MODULE AND METHOD FOR EXTRACTING DEPTH INFORMATION BY SAME

(71) Applicant: LG INNOTEK CO., LTD., Seoul (KR)

(72) Inventors: Chang Hyuck Lee, Seoul (KR); Kang Yeol Park, Seoul (KR); Seong Ha Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/050,641

(22) PCT Filed: Apr. 26, 2019

(86) PCT No.: PCT/KR2019/005057
§ 371 (c)(1),
(2) Date: Oct. 26, 2020

(87) PCT Pub. No.: WO2019/209064
PCT Pub. Date: Oct. 31, 2019

(65) Prior Publication Data
US 2021/0065390 A1 Mar. 4, 2021

(30) Foreign Application Priority Data
Apr. 26, 2018 (KR) .................. 10-2018-0048635

(51) Int. Cl.
*G06T 7/521* (2017.01)
*G06T 7/55* (2017.01)
*H04N 5/232* (2006.01)

(52) U.S. Cl.
CPC .............. *G06T 7/521* (2017.01); *G06T 7/55* (2017.01); *H04N 5/23232* (2013.01); *G06T 2207/10028* (2013.01)

(58) Field of Classification Search
CPC . G06T 7/521; G06T 7/55; G06T 2207/10028; H04N 5/23232
See application file for complete search history.

(56) References Cited

U.S. PATENT DOCUMENTS 5,701,165 A * 12/1997 Kubo ................ G02F 1/133502
349/137
7,751,066 B2 * 7/2010 Iwasaki .................. G06T 7/521
250/559.22

(Continued)

FOREIGN PATENT DOCUMENTS

| CN | 104935790 A | 9/2015 |
| KR | 10-1272573 B1 | 6/2013 |
| WO | WO-2017/149092 A2 | 9/2017 |

OTHER PUBLICATIONS

International Search Report in International Application No. PCT/KR2019/005057, filed Apr. 26, 2019.

(Continued)

*Primary Examiner* — Gregory M Desire
(74) *Attorney, Agent, or Firm* — Saliwanchik, Lloyd & Eisenschenk

(57) ABSTRACT

A camera module according to an embodiment of the present invention includes a structured light projector configured to generate structured light of a specific pattern and changes an optical path of the structured light into units of subpixels of an image sensor for each image frame to project the structured light onto a subject, and a structured light camera configured to photograph the subject onto which the structured light is projected to generate a plurality of low-resolution image frames and generate a high-resolution depth map from the plurality of low-resolution image frames.

11 Claims, 5 Drawing Sheets

(56) References Cited

U.S. PATENT DOCUMENTS

| | | | | |
|---|---|---|---|---|
| 8,538,166 | B2* | 9/2013 | Gordon | G01B 11/25 |
| | | | | 382/201 |
| 9,325,973 | B1 | 4/2016 | Hazeghi et al. | |
| 9,383,549 | B2* | 7/2016 | Ueno | G02B 13/0015 |
| 9,578,218 | B2 | 2/2017 | Topliss | |
| 10,360,693 | B2* | 7/2019 | Wallack | H04N 9/00 |
| 10,375,282 | B2* | 8/2019 | Ishida | B29D 11/00375 |
| 10,375,292 | B2* | 8/2019 | Park | G02B 3/0006 |
| 10,429,183 | B2* | 10/2019 | Johnson | G01B 11/2513 |
| 10,785,463 | B2* | 9/2020 | Appia | H04N 13/106 |
| 2015/0022642 | A1 | 1/2015 | Appia et al. | |
| 2015/0301690 | A1* | 10/2015 | Masuda | G03B 21/10 |
| | | | | 345/175 |
| 2016/0212332 | A1 | 7/2016 | Tang et al. | |
| 2018/0284328 | A1* | 10/2018 | Kawai | G10K 13/00 |
| 2020/0175287 | A1* | 6/2020 | Reeves | G06V 20/58 |
| 2021/0065390 | A1* | 3/2021 | Lee | G01B 11/25 |

OTHER PUBLICATIONS

Office Action dated Jan. 6, 2022 in Chinese Application No. 201980028493.0.

* cited by examiner

FIG. 6A
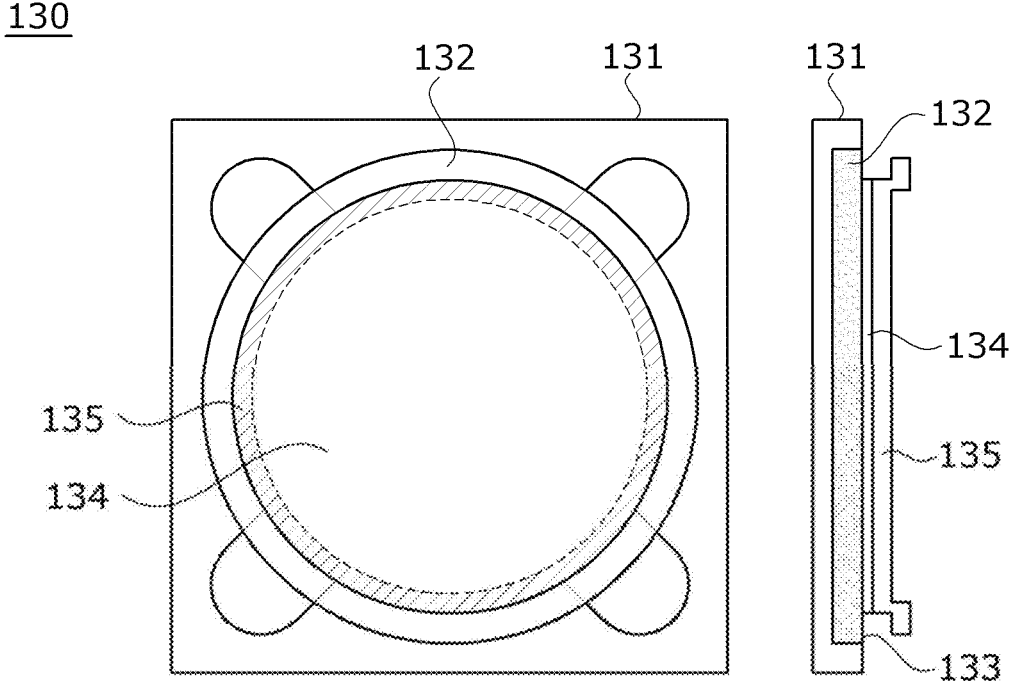
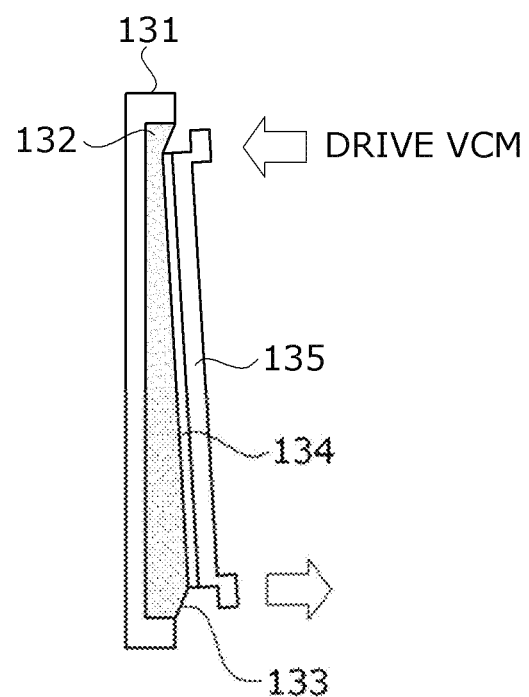
FIG. 6B

CAMERA MODULE AND METHOD FOR EXTRACTING DEPTH INFORMATION BY SAME

CROSS-REFERENCE TO RELATED APPLICATIONS

This application is the U.S. national stage application of International Patent Application No. PCT/KR2019/005057, filed Apr. 26, 2019, which claims the benefit under 35 U.S.C. § 119 of Korean Application No. 10-2018-0048635, filed Apr. 26, 2018, the disclosures of each of which are incorporated herein by reference in their entirety.

TECHNICAL FIELD

The present invention relates to a camera module and a method of extracting depth information using the same.

BACKGROUND ART

Three-dimensional (3D) content has been applied in various fields such as the fields of education, manufacturing, autonomous driving, and the like, as well as the fields of games and culture, and depth information (e.g., a depth map) is required to obtain 3D content. The depth information is information representing a spatial distance and a distance from one point on a two-dimensional (2D) image to another point.

As one of methods of obtaining depth information, there is an infrared (IR) structured light method of extracting depth information by projecting IR structured light onto an object and analyzing light reflected from the object. The IR structured light method is disadvantageous in that it is difficult to obtain a desired level of depth resolution with respect to a moving object.

To obtain a desired level of depth resolution using the IR structured light method, the number of dots constituting a pattern of a structured light should be increased. However, dots should be identified according to a resolution of an image sensor, and thus it is difficult to increase the number of dots indefinitely until a desired level of depth resolution is obtained.

DISCLOSURE

Technical Problem

The present invention is directed to providing a camera module for extracting depth information using a structured light method and a method of extracting depth information using the same.

Technical Solution

A camera module according to an embodiment of the present invention includes a structured light projector configured to generate structured light of a specific pattern and change an optical path of the structured light into units of subpixels of an image sensor for each image frame to project the structured light onto a subject, and a structured light camera configured to photograph the subject onto which the structured light is projected to generate a plurality of low-resolution image frames and generate a high-resolution depth map from the plurality of low-resolution image frames.

The structured light projector may be disposed a predetermined distance from the structured light camera.

The subpixels may have a size greater than zero pixels and less than one pixel.

The structured light projector may include a light source unit configured to generate light, an optical unit configured to collect the generated light to generate the structured light of the specific pattern, and a tilting unit configured to change the optical path of the structured light in units of subpixels of a camera image sensor for each image frame.

The tilting unit may change the optical path of the structured light to one of up, down, left and right directions.

The tilting unit may be positioned between the light source unit and the optical unit to change the optical path of the structured light.

The tilting unit may be positioned in front of the optical unit to change the optical path of the structured light.

The optical unit may include a light-converging element configured to collect light generated by the light source unit, and a pattern element configured to diffract the light collected by the light-converging element to generate the structured light of the specific pattern. The tilting unit may be positioned between the light-converging element and the pattern element to change the optical path of the structured light.

Optical paths of the structured light corresponding to the plurality of low-resolution image frames may be different from each other.

The structured light camera may generate a plurality of low-resolution depth maps corresponding to the plurality of low-resolution image frames and apply a super-resolution technique to the plurality of low-resolution depth maps to generate a high-resolution depth map.

The structured light camera may apply a super-resolution technique to the plurality of low resolution image frames to generate a high-resolution image frame and generate a high-resolution depth map corresponding to the high-resolution image frame.

Advantageous Effects

With a camera module according to an embodiment of the present invention, high-resolution depth information can be obtained without significantly increasing the number of pixels of an image sensor or the number of dots of a structured light pattern.

DESCRIPTION OF DRAWINGS

FIGS. 6A and 6B are diagrams for describing a tunable prism according to an embodiment of the present invention.

MODES OF THE INVENTION

Figure 1:
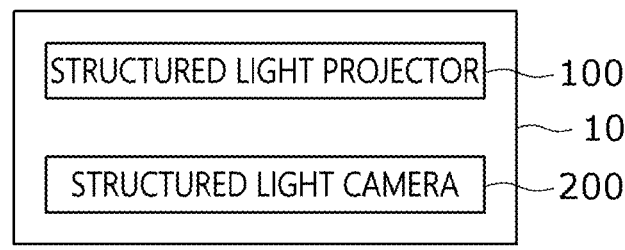
FIG. 1 is a block diagram of a camera module according to an embodiment of the present disclosure.

Various changes may be made in the present invention and various embodiments may be implemented, and thus, example embodiments are illustrated in the drawings and described herein. However, it should be understood that the present invention is not limited to particular embodiments and include all modifications, equivalents, and alternatives falling within the idea and scope of the present invention.

Terms, including ordinal numbers such as first and second, may be used to describe various components but these components should not be construed as being limited by the terms. The terms are only used to distinguish one component from another. For example, a second component may be referred to as a first component without departing from the scope of the present invention, and similarly, a first component may also be referred to as a second component. The term "and/or" includes a combination of a plurality of related items described herein or any one of the plurality of related items.

When a component is referred to as being "coupled to" or "connected" to another component, it should be understood that the component may be directly coupled to or connected to the other component but another component may be interposed therebetween. In contrast, when a component is referred to as being "directly coupled to" or "directly connected" to another component, it should be understood that no component is interposed therebetween.

The terms used in this application are only used to describe certain embodiments and are not intended to limit the present invention. As used herein, the singular expressions are intended to include plural forms as well, unless the context clearly dictates otherwise. It should be understood that the terms "comprise" and/or "comprising", when used herein, specify the presence of stated features, integers, steps, operations, elements, components, or a combination thereof, but do not preclude the presence or addition of one or more features, integers, steps, operations, elements, components, or a combination thereof.

Unless defined otherwise, all terms used herein, including technical or scientific terms, have the same meaning as commonly understood by those of ordinary skill in the art to which the present invention pertains. Terms such as those defined in a commonly used dictionary should be interpreted as having meanings consistent with meanings in the context of related technologies and should not be interpreted as ideal or excessively formal meanings unless explicitly defined in the present application.

Hereinafter, embodiments will be described in detail with reference to the accompanying drawings, but the same or corresponding components are assigned the same reference numbers even in different drawings and are not redundantly described herein.

First, a camera module according to an embodiment of the present invention will be described in detail with reference to FIGS. 1 and 2.

FIG. 1 is a block diagram of a camera module according to an embodiment of the present disclosure. FIG. 2 is a diagram illustrating changing an optical path of structured light according to an embodiment of the present invention.

As illustrated in FIG. 1, a camera module 10 according to the embodiment of the present invention includes a structured light projector 100 and a structured light camera 200.

The structured light projector 100 generates structured light of a specific pattern and then projects the structured light onto a subject. The structured light projector 100 projects the structured light onto the subject by changing an optical path of the structured light for each image frame in units of subpixels of an image sensor included in the structured light camera 200.

Figure 2:
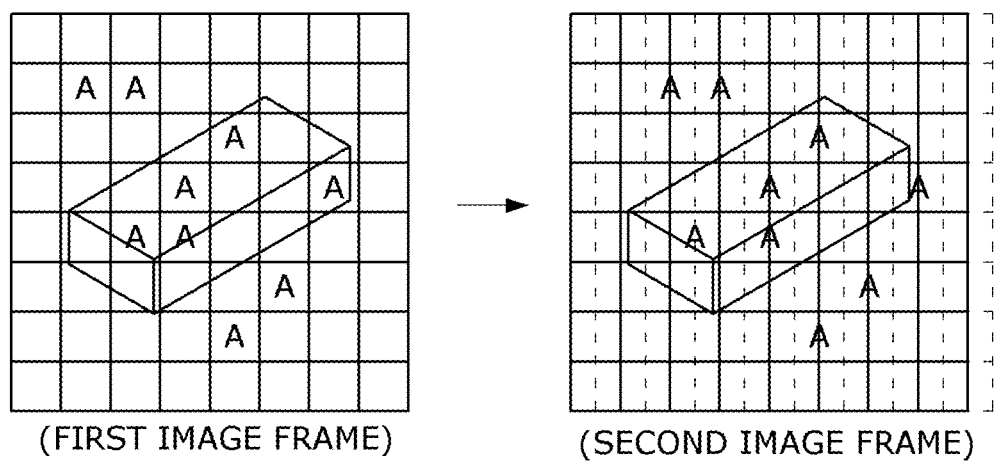
FIG. 2 is a diagram illustrating changing an optical path of structured light according to an embodiment of the present invention.

In FIG. 2, a first image frame represents projecting structured light onto a subject in a reference optical path. A second image frame represents projecting the structured light, the optical path of which is moved to the right in units of subpixels with respect to a reference optical path, onto the subject. A comparison between the first image frame and the second image frame reveals that a specific pattern of the structured light projected onto the subject is moved to the right in units of subpixels. That is, the specific pattern is moved by the subpixels and projected onto the subject by changing the optical path of the structured light by the subpixels. FIG. 2 illustrates changing the optical path of the structured light to the right by the subpixel, but the optical path may be changed to one of up, down, left, and right directions.

The structured light projector 100 may be disposed a certain distance from the structured light camera 200 to extract depth information. For example, when the camera module 10 according to the embodiment of the present invention is applied to a mobile terminal such as a smart phone, the distance between the structured light projector 100 and the structured light camera 200 may be in a range of 5 to 200 mm. Alternatively, the structured light projector 100 and the structured light camera 200 may be disposed together in the camera module 10.

The structured light camera 200 photographs the subject onto which the structured light of the specific pattern is projected to generate a plurality of low-resolution image frames. In addition, the structured light camera 200 generates a high-resolution image frame by matching the plurality of low-resolution image frames together. Here, the high-resolution image frame refers to an image frame having a higher resolution than that of the plurality of low-resolution image frames.

The structured light camera 200 is configured as an optical structure corresponding to a wavelength of the structured light. For example, when the structured light is generated to have a wavelength of an infrared ray, the structured light camera 200 may be configured as an optical structure capable of photographing the wavelength of the infrared ray.

The camera module 10 may further include a lighting unit (not shown). The lighting unit may emit light to the subject separately from the structured light projector 100. The light emitted by the lighting unit may be near-infrared ray or visible light. When the lighting unit emits light, the structured light camera 200 may photograph the subject to extract the shape and feature points of the subject.

Next, a structured light projector according to an embodiment of the present invention will be described in detail with reference to FIGS. 3 and 4.

Figure 3:
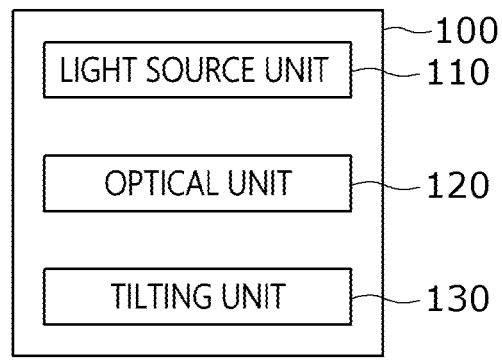
FIG. 3 is a block diagram of a structured light projector according to an embodiment of the present invention.
Figure 4:
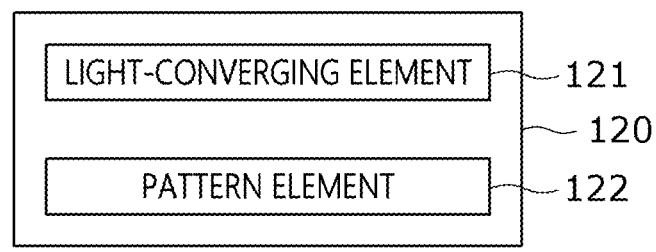
FIG. 4 is a block diagram of an optical unit according to an embodiment of the present invention.

FIG. 3 is a block diagram of a structured light projector according to an embodiment of the present invention. FIG. 4 is a block diagram of an optical unit according to an embodiment of the present invention.

As illustrated in FIG. 3, a structured light projector 100 according to an embodiment of the present invention includes a light source unit 110, an optical unit 120, and a tilting unit 130.

The light source unit 110 generates light. In this case, the light generated by the light source unit 110 may be an infrared ray having a wavelength of 770 to 3000 nm or visible light having a wavelength of 380 to 770 nm. The light source unit 110 may generate light using a light-emitting diode (LED). The LED includes an organic light-emitting diode (OLED) and a laser diode (LD). The light source unit 110 may be an array of a plurality of LEDs.

The optical unit 120 collects light generated by the light source unit 110 to generate structured light of a specific pattern. In addition, the optical unit 120 projects the structured light of the specific pattern onto a subject. The optical unit 120 includes a light-converging element 121 and a pattern element 122.

The light-converging element 121 collects the light generated by the light source unit 110. The light-converging element 121 may include at least one of a concave lens, a convex lens, and a collimator.

The pattern element 122 diffracts the light received from the light-converging element 121 to generate structured light of a specific pattern. The pattern element 122 may include at least one of a diffractive optical element (DOE), a hologram optical element (HOE), and a computer-generated hologram (CGH). For example, when the pattern element 122 is a diffractive optical element (DOE), structured light of a specific pattern may be generated by changing a concavo-convex shape of the pattern element 122.

In this case, the specific pattern may be achieved using a plurality of dots to facilitate finding a corresponding point. Here, the plurality of dots each have a unique pattern to be distinguished from each other. The specific pattern may be embodied as a grid pattern, a vertical pattern, or a horizontal pattern.

The tilting unit 130 changes an optical path of structured light for each image frame in units of subpixels of an image sensor included in a structured light camera. In this case, the tilting unit 130 may change the optical path of the structured light to one of up, down, left and right directions. Therefore, when a subject is photographed by the structured light camera after emitting, onto the subject, the structured light, the optical path is changed in units of the subpixels of the image sensor, a low-resolution image frame moved by the subpixels in one of the up, down, left, and right directions is generated.

Figure 5:
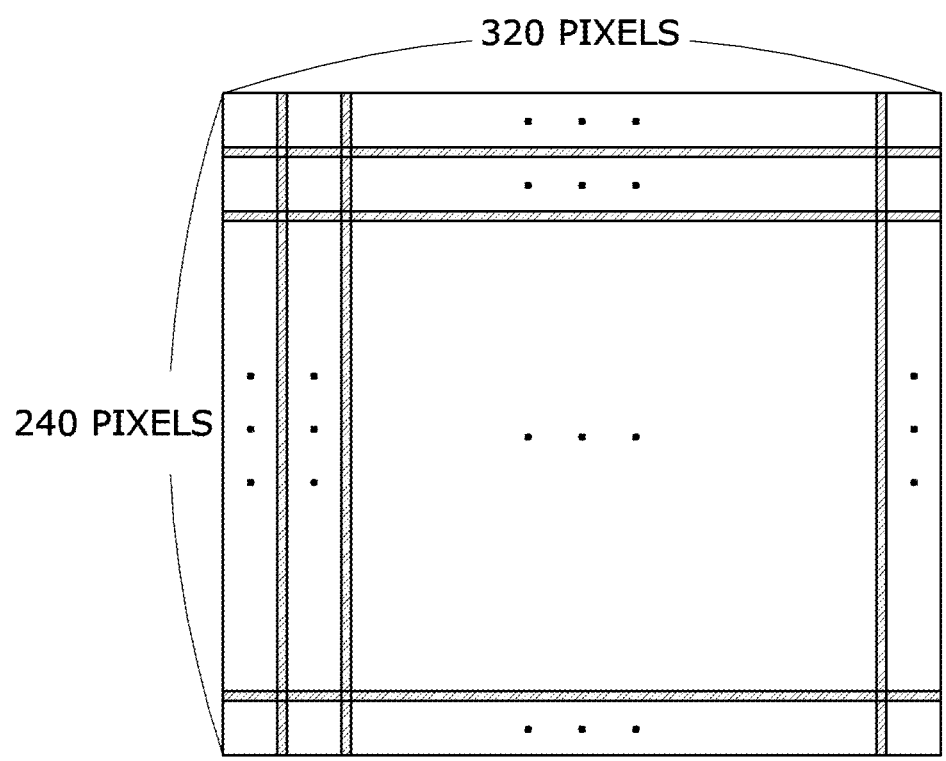
FIG. 5 is a diagram for describing a subpixel according to an embodiment of the present invention.

FIG. 5 is a diagram for describing a subpixel according to an embodiment of the present invention. FIG. 3 illustrates an image sensor having a resolution of 320×240, in which 76,800 pixels are arranged in a matrix. That is, in FIG. 3, one block is one pixel. In this case, there may be a certain gap between a plurality of pixels, as is shaded in FIG. 5. In one embodiment of the present invention, a pixel and the certain gap adjacent thereto will be described together as one pixel. Each subpixel may be larger than zero pixels and smaller than one pixel. For example, a size of each subpixel may be a 0.5 pixel size, a ⅓ pixel size or a ¼ pixel size. The size of each subpixel may be designed or changed by those of ordinary skill in the art according to resolutions of a low-resolution image frame and a high-resolution image frame.

Next, a structure of a tilting unit according to an embodiment of the present invention will be described with reference to FIGS. 6A-7C.

A tilting unit according to an embodiment of the present invention deflects light incident thereon to change an optical path of the light. Specifically, the tilting unit changes the optical path of the light using a height difference of a material having a specific refractive index. In this case, the material having the specific refractive index may be optical liquid. The tilting unit may be configured as a tunable prism or a liquid lens having an optical structure capable of changing an optical path of reflected light.

FIGS. 6A and 6B are diagrams for describing a tunable prism according to an embodiment of the present invention.

FIG. 6A illustrates a structure of a tunable prism. As illustrated in FIG. 6A, the tunable prism includes a glass container 131, an optical liquid layer 132, a membrane 133, a lens shaper 134, a glass window 135, and an actuator (not shown).

The glass container 131 is configured to store liquid. The glass container 131 is formed of a transparent material allowing light to pass therethrough. The glass container 131 may be formed of borosilicate.

The optical liquid layer 132 is formed of an optical liquid having fluidity and allowing light to pass therethrough. The optical liquid layer 132 is obtained by storing the optical liquid in the glass container 131. An optical path may be changed by the lens shaper 134 changing a shape of the optical liquid layer 132. A refractive index of the optical liquid may be in a range of 1 to 1.5. The optical liquid may be perfluoro polyether (PFPE).

The membrane 133 seals the glass container 131 to inhibit the optical liquid stored therein from flowing to the outside. In addition, the membrane 133 seals the optical liquid layer 132 to inhibit foreign substances from entering the optical liquid layer 132. The membrane 133 is formed of a transparent material allowing light to pass therethrough. The membrane 133 is stretchable. The membrane 133 may be formed of polydimethyl siloxane (PDMS).

The glass window 135 includes a plate formed of a transparent material allowing light to pass therethrough. The glass window 135 may be formed of borosilicate.

The lens shaper 134 may be formed of a metal. The lens shaper 134 may be configured as a circular plate in which a hole through which light may pass is formed. The lens shaper 134 may include a power transmission member to which a force is applied from an actuator onto a point thereon symmetrical about the origin.

The actuator may apply pressure onto the power transmission member of the lens shaper 134 to change the shape of the optical liquid layer 132. The actuator may be a voice coil motor (VCM).

FIG. 6B illustrates a driving mechanism of the tunable prism. As illustrated in FIG. 6B, in the tunable prism according to the embodiment of the present invention, the actuator applies pressure onto to the power transmission member of the lens shaper 134 to change the shape of the optical liquid layer 312, thereby achieving a height difference. Incident light is deflected due to the height difference of the optical liquid layer 132, thus changing the optical path.

Figure 7A:
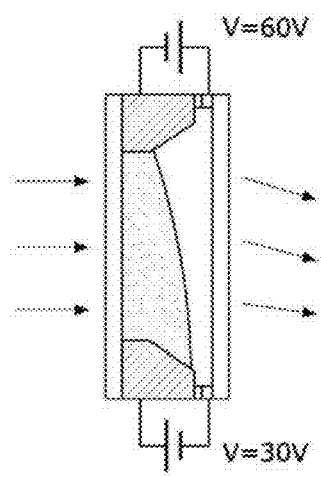
FIGS. 7A-7C are views for describing a liquid lens according to an embodiment of the present invention.
Figure 7B:
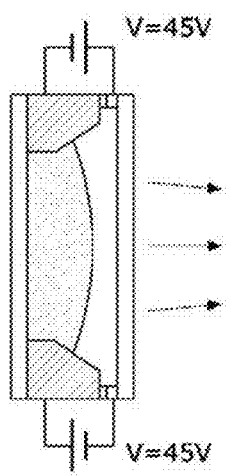
Figure 7C:
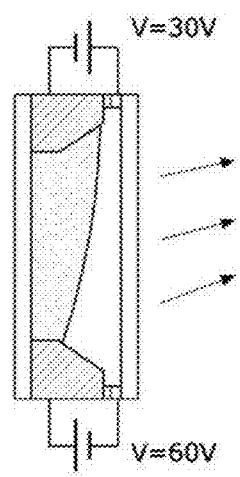

FIGS. 7A-7C are views for explaining a liquid lens according to an embodiment of the present invention.

As illustrated in FIGS. 7A-7C, the liquid lens may have a structure in which two optical liquids having different properties are stored between two plates. The two optical liquids are formed of a fluid material having a refractive index of 1 to 2. When a driving voltage is applied to the two optical liquids, an interface between the two optical liquids is deformed. When light passes through the interface, an optical path of the light may change. As a deviation between driving voltages applied to the two optical liquids increases, a degree of change in a field-or-view (FOV) angle of the interface may increase.

For example, as illustrated in FIGS. 7A to 7C, when voltages of 60 V and 30 V are applied, the height of a first liquid decreases at 60 V and increases at 30 V. Then, an optical path of incident reflected light changes at 30 V as the incident reflected light passes through the liquid lens. When a voltage of 45 V is applied to both of the two optical liquids as illustrated in FIG. 7B, the optical path of the reflected light does not change.

Figure 8:
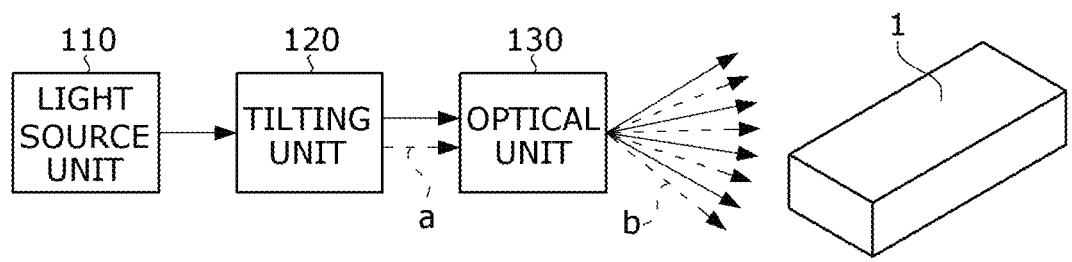
FIGS. 8 to 10 are diagrams illustrating arrangements of a tilting unit according to embodiments of the present invention.
Figure 9:
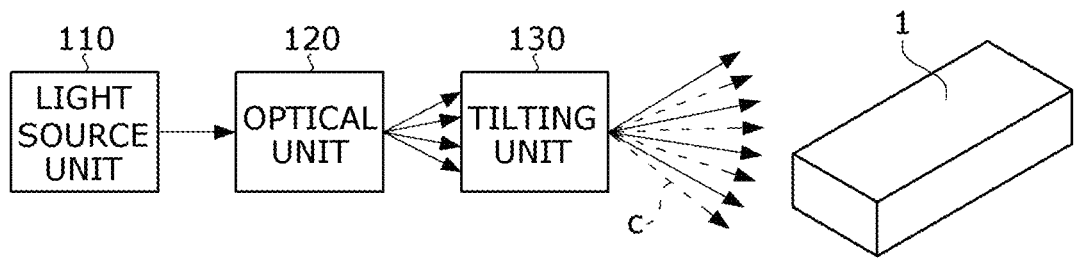
Figure 10:
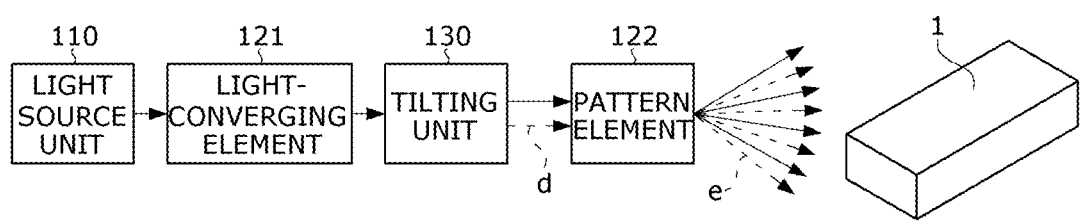

Next, an arrangement of a tilting unit according to an embodiment of the present invention will be described with reference to FIGS. 8 to 10. FIGS. 8 to 10 are diagrams illustrating arrangements of a tilting unit according to embodiments of the present invention.

First, as illustrated in FIG. 8, a tilting unit 130 may be positioned between a light source unit 110 and an optical unit 120. Accordingly, the tilting unit 130 changes an optical path of light generated by the light source unit 110. As the optical path of the light is changed, the optical unit 120 generates structured light, the optical path of which is changed. For example, it is assumed that in a first frame, structured light is projected onto a subject 1 according to an optical path indicated by a solid line as illustrated in FIGS. 6A and 6B. Then, in a second frame subsequent to the first frame, the tilting unit 130 moves an optical path of light, which is generated by the light source unit 110, as indicated by an arrow a and transmits the light to the optical unit 120. Then, the optical unit 120 generates structured light of an optical path indicated by an arrow b according to the changed optical path and projects the structured light onto the subject 1.

Next, as illustrated in FIG. 9, a tilting unit 130 may be positioned in front of an optical unit 120. Accordingly, the tilting unit 130 changes an optical path of structured light generated by the optical unit 120. For example, it is assumed that in a first frame, structured light is projected onto a subject 1 according to an optical path indicated by a solid line as illustrated in FIG. 9. Then, in a second frame subsequent to the first frame, the tilting unit 130 moves an optical path of structured light, which is generated by the optical unit 120, as indicated by an arrow c and projects the structured light to a subject 1.

Next, as illustrated in FIG. 10, the tilting unit 130 may be included in an optical unit. Specifically, the tilting unit 130 may be positioned between a light-converging element 121 and a pattern element 122 of the optical unit. Accordingly, the tilting unit 130 changes an optical path of light collected by the light-converging element 121 and transmits the light to the pattern element 122. Then, the pattern element 122 may generate structured light, the optical path of which is changed. For example, it is assumed that in a first frame, structured light is projected onto a subject 1 according to an optical path indicated by a solid line as illustrated in FIG. 8. Then, in a second frame subsequent to the first frame, the tilting unit 130 changes an optical path of light, which is received from the light-converging element 121, as indicated by an arrow d and transmits the light to the pattern element 122. Then, the pattern element 122 generates structured light having an optical path indicated by an arrow e and projects the structured light onto the subject 1.

Figure 11:
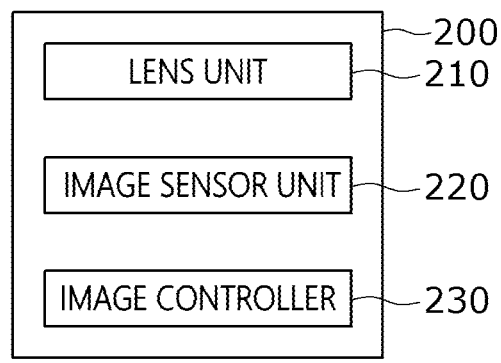
FIG. 11 is a block diagram of a structured light projector according to an embodiment of the present invention.

FIG. 11 is a block diagram of a structured light projector according to an embodiment of the present invention.

As illustrated in FIG. 11, a structured light camera 200 according to an embodiment of the present invention includes a lens unit 210, an image sensor unit 220, and an image controller 230.

The lens unit 210 collects structured light reflected from a subject and transmits the structured light to the image sensor 220.

According to an embodiment of the present invention, the lens module 210 may include a lens, a lens barrel, and a holder.

A plurality of lenses or one lens may be provided. When a plurality of lenses are provided, the plurality of lenses may be aligned about a central axis to form an optical system. Here, the central axis may be the same as an optical axis of the optical system of the structured light camera 200.

The lens barrel may be coupled to the holder and may include an internal space for accommodating a lens. The lens barrel may be, for example, rotatably coupled to one or a plurality of lenses or may be coupled thereto in a different manner such as a method using an adhesive (e.g., an adhesive resin such as epoxy).

The holder may be coupled to the lens barrel to support the lens barrel and coupled to a substrate to which an image sensor is attached. The holder may have a space, into which IR glass is attachable, under the lens barrel. The holder may include a helical structure and be rotatably coupled to a lens barrel having a helical structure. However, this is only an example, and the holder and the lens barrel may be coupled to each other through an adhesive or be integrally formed.

The image sensor unit 220 generates an image signal by absorbing structured light collected through the lens unit 210. The image sensor may include a photo diode capable of absorbing a wavelength of the structured light. The image sensor unit 220 may be configured as a structure in which a plurality of pixels are arranged in a matrix. The image sensor unit 220 may be a complementary metal oxide semiconductor (CMOS) image sensor or a charge-coupled device (CCD) image sensor.

The image controller 130 generates a plurality of low-resolution image frames using an image signal and generates a high-resolution depth image using the plurality of low-resolution image frames.

In an embodiment of the present invention, in order to increase a resolution of depth information, a super resolution (SR) technique is used to generate a high-resolution image from a plurality of low-resolution image frames. A mathematical model of the SR technique may be expressed by Equation 1 below.

$$y_k = D_k B_k M_k x + n_k \qquad \text{Equation 1}$$

Here, $1 \leq k \leq p$, p represents the number of low-resolution images, and $y_k$ represents low-resolution images$(=y_{k,1}, y_{k,2}, \ldots, y_{k,M}^T)$, wherein $M = N_1 * N_2$, $D_k$ represents a down-sampling matrix, $B_k$ represents an optical blur matrix, $M_k$ represents an image warping matrix, and x represents a high-resolution image$(=x_1, x_2, \ldots, x_N^T)$, wherein $N = L_1 N_1 * L_2 N_2$, and $n_k$ represents noise. That is, the SR technique refers to a technique for estimating x by applying an inverse function of resolution degradation elements estimated from yk. The SR technique may be largely divided into a statistical method and a multiframe method, and the multiframe method may be largely divided into a space division method and a time division method. When the SR technique is used to obtain depth information, the statistical method may be attempted because an inverse function of $M_k$ of Equation 1 does not exist. However, in the case of the statistical method, an iterative calculation process is required and thus efficiency is low.

In order to apply the SR technique to extract depth information, the image controller 230 may generate a plurality of low-resolution image frames using an image signal received from the image sensor unit 220, generate a high-resolution image frame by applying the SR technique to the plurality of low-resolution image frames, and extract depth information corresponding to the high-resolution image frame.

Specifically, the image controller 230 generates a plurality of low-resolution image frames using an image signal.

In addition, the image controller 230 matches a positional relationship among the plurality of low-resolution image frames. Specifically, the image controller 230 sets one of the plurality of low-resolution image frames as a reference image and matches the positional relationship among the plurality of low-resolution image frames with respect to the reference image. In one embodiment of the present invention, the plurality of low-resolution image frames are images obtained by photographing structured light projected onto a subject according to different light paths. That is, in the case of a plurality of image frames according to an embodiment of the present invention, motions between frames are determined in units of pixels when an image is captured. Therefore, unlike the SR technique for matching a plurality of images by estimating motions in units of pixels, an image controller according to an embodiment of the present invention matches a positional relationship among a plurality of low-resolution image frames without performing motion estimation in units of pixels.

Next, the image controller 230 estimates a matching point using the matched positional relationship and estimates a value of each pixel of the high-resolution image frame using the estimated matching point. In addition, the image controller 230 generates a high-resolution image frame by post-processing the estimated values of the pixels. In this case, the image controller 230 may perform post-processing using a de-blocking filter or a de-blurring filter.

Next, the image controller 230 may extract depth information using the high-resolution image frame and generate a high-resolution depth map using the depth information.

Alternatively, high-resolution depth information may be extracted by applying the SR technique to a plurality of pieces of low-resolution depth information.

Specifically, the image controller 230 generates a plurality of low-resolution image frames using an image signal. Next, the image controller 230 generates a low-resolution depth map for each of the plurality of low-resolution image frames.

Thereafter, the image controller 230 generates a high-resolution depth map by applying the SR technique to each of the plurality of low-resolution depth map. A process of applying the SR technique to the plurality of low-resolution depth maps is the same as that of applying the SR technique to the low-resolution image frames as described above, and thus, a detailed description thereof will be omitted.

Although the embodiments have been described above, these embodiments are only examples and the present invention should not be construed as being limited thereto, and various modifications and applications, which are not mentioned herein, may be made by those of ordinary skill in the field to which the present invention pertains without departing from the essential features of the present embodiment. For example, each component specifically described in the embodiments may be modified and implemented. All differences related to these modifications and applications should be construed as being included in the scope of the present invention defined in the appended claims.

The invention claimed is:

1. A camera device comprising:
a structured light projector configured to generate structured light of a specific pattern and change an optical path of the structured light in units of subpixels of an image sensor for each image frame to project the structured light onto a subject, and
a structured light camera configured to photograph the subject onto which the structured light is projected to generate a plurality of low-resolution image frames and extract a high-resolution depth map based on the plurality of low-resolution image frames;
wherein the structured light projector comprises an optical path converter configured to change the optical path of the structured light in units of subpixels of a camera image sensor for each image frame, the optical path converter comprising a liquid layer configured to change a shape of the liquid layer when an external stimulus is applied to the liquid layer.

2. The camera device of claim 1, wherein the structured light projector is disposed at a predetermined distance from the structured light camera.

3. The camera device of claim 1, wherein the subpixels each has a size greater than zero pixels and smaller than one pixel.

4. The camera device of claim 1, wherein the structured light projector comprises:
a light source configured to generate light; and
an optical pattern generator configured to collect the generated light to generate the structured light of the specific pattern.

5. The camera device of claim 4, wherein an optical path converter changes the optical path of the structured light to one of up, down, left, and right directions with respect to a reference optical path.

6. The camera device of claim 4, wherein an optical path converter is positioned between the light source and the optical pattern generator to change the optical path of the structured light.

7. The camera device of claim 4, wherein an optical path converter is positioned in front of the optical pattern generator to change the optical path of the structured light.

8. The camera device of claim 4, wherein the optical pattern generator comprises:
a light-converging element configured to collect light generated by the light source; and
a pattern element configured to diffract the light collected by the light-converging element to generate the structured light of the specific pattern, and
wherein an optical path converter is positioned between the light-converging element and the pattern element to change the optical path of the structured light.

9. The camera device of claim 1, wherein optical paths of the structured light corresponding to the plurality of low-resolution image frames are different from each other.

10. The camera devices of claim 9, wherein the structured light camera is configured to generate a plurality of low-resolution depth maps corresponding to the plurality of low-resolution image frames, respectively and apply a super-resolution method to the plurality of low-resolution depth maps to generate a high-resolution depth map.

11. The camera device of claim 9, wherein the structured light camera is configured to apply a super-resolution method to the plurality of low resolution image frames to generate a high-resolution image frame and generate a high-resolution depth map corresponding to the high-resolution image frame.

* * * * *